United States Patent
Lin et al.

(10) Patent No.: US 9,723,670 B2
(45) Date of Patent: Aug. 1, 2017

(54) POWER SUPPLY DEVICE WITH CONTROL BASED ON SETTING RESISTOR

(71) Applicant: Salcomp Taiwan Co., Ltd, Taipei (TW)

(72) Inventors: Ying-Chu Lin, Taipei (TW); Hung-Yi Shu, Taipei (TW)

(73) Assignee: Salcomp Taiwan Co., Ltd., Taipei (TW)

( * ) Notice: Subject to any disclaimer, the term of this patent is extended or adjusted under 35 U.S.C. 154(b) by 0 days.

(21) Appl. No.: 15/336,133

(22) Filed: Oct. 27, 2016

(65) Prior Publication Data

US 2017/0048938 A1  Feb. 16, 2017

Related U.S. Application Data

(63) Continuation-in-part of application No. 14/750,237, filed on Jun. 25, 2015, now Pat. No. 9,516,710.

(51) Int. Cl.
*H05B 33/08* (2006.01)
*H02M 7/04* (2006.01)
*H02M 1/14* (2006.01)

(52) U.S. Cl.
CPC .......... *H05B 33/0815* (2013.01); *H02M 1/14* (2013.01); *H02M 7/04* (2013.01); *H05B 33/0812* (2013.01)

(58) Field of Classification Search
CPC . H05B 33/0815; H05B 33/0812; H02M 1/14; H02M 7/04
USPC .......................................................... 315/206
See application file for complete search history.

(56) References Cited

U.S. PATENT DOCUMENTS

| 9,516,710 B1* | 12/2016 | Lin ................... H05B 33/0815 |
|---|---|---|
| 2002/0047646 A1 | 4/2002 | Lys et al. |
| 2006/0220571 A1 | 10/2006 | Howell et al. |
| 2013/0082609 A1 | 4/2013 | Williams et al. |
| 2014/0070705 A1 | 3/2014 | Cheng et al. |
| 2014/0167632 A1 | 6/2014 | Pijlman et al. |
| 2014/0300274 A1* | 10/2014 | Acatrinei ........... H05B 33/0815 315/85 |

(Continued)

FOREIGN PATENT DOCUMENTS

DE  202015103516 U1  7/2015

*Primary Examiner* — Dylan White
(74) *Attorney, Agent, or Firm* — Muncy, Geissler, Olds & Lowe, P.C.

(57) ABSTRACT

A power supply device includes a power conversion module and a power regulating module. The power conversion module is configured to convert an AC electric power into a DC electric power. The power regulating module includes a microprocessor, a voltage-dividing resistor, a constant-voltage regulator, and a constant-current regulator. The voltage-dividing resistor is electrically connected to the setting resistor and the microprocessor. The constant-voltage regulator is electrically connected to the power conversion module, the dividing resistor, and the setting resistor; The constant-current regulator is electrically connected to the power conversion module and the microprocessor. A constant voltage is coupled to the dividing resistor and the setting resistor to impress a first adjustment signal and a second adjustment signal based on the setting resistor such that a driving signal outputted from the power regulating module to the power conversion module is adjusted to yield a desired voltage and a desired current.

20 Claims, 5 Drawing Sheets

(56) References Cited

U.S. PATENT DOCUMENTS

2015/0195878 A1* 7/2015 Garrity .............. H05B 33/0821
                                                                          315/186
2015/0271884 A1   9/2015 Kim et al.
2016/0098046 A1* 4/2016 Jutras ................ H05B 33/0851
                                                                          320/107
2017/0086272 A1* 3/2017 O'Neil .............. H05B 33/0845

* cited by examiner

POWER SUPPLY DEVICE WITH CONTROL BASED ON SETTING RESISTOR

CROSS REFERENCE TO RELATED APPLICATION

This application is a Continuation-In-Part of U.S. application Ser. No. 14/750,237, filed Jun. 25, 2015. The entire disclosure is incorporated herein by reference.

BACKGROUND OF THE INVENTION

Field of the Invention

The present invention relates to driving device, and in particular to a power supply device with control based on setting resistor.

Description of Related Art

Light emitting diodes (LEDs) have high luminous efficiency, long service time, widely operation temperature and environmental mercury-free, making them beyond the incandescent and fluorescent light bulbs, and led lighting field into a new solid-state lighting era.

General lighting fixtures, such as incandescent lamps, fluorescent bulbs or lamps are usually driven by alternative current (AC) electric power, however, the LEDs are driven be direct current (DC) electric power. Thus, an essential condition for replacing incandescent lamps, fluorescent bulbs or lamps with LED lighting fixture is that the LED lighting fixture can directly connected to AC electric power.

LEDs are semiconductor devices with low turn on voltage, and can emit light when an electrical current is passed through it in a specific direction. Moreover, LEDs are also current dependent devices with their light output intensity being directly proportional to the forward current flowing therethrough. Since the LEDs cannot have totally same parameters (such as internal resistance) even in the same manufacturing process, the same type of lighting fixtures with the LEDs cannot provide light with the same luminous intensity.

SUMMARY OF THE INVENTION

According to one aspect of the present disclosure, a power supply device with control based on a setting resistor includes a power conversion module and a power regulating module. The power conversion module is configured to convert an alternating current (AC) electric power into a direct current (DC) electric power. The power regulating module is electrically connected to the power conversion module and includes a microprocessor, a voltage-dividing resistor, a constant-current regulator, and a constant-voltage regulator. The voltage-dividing resistor is electrically connected to the setting resistor in series and the microprocessor for providing a first adjustment signal. The constant-current regulator is electrically connected to the power conversion module and the node between the dividing resistor and the setting resistor for receiving the first adjustment signal. The constant-voltage regulator is electrically connected to the power conversion module and the microprocessor for receiving a second adjustment signal in accordance with the setting resistor generated by the microprocessor. A driving signal generated by the constant-current regulator and the constant-voltage regulator is transmitted to the power conversion module for making the power conversion module yield the DC electric power with a desired voltage and a desire current.

According to another aspect of the present disclosure, a power supply device with control based on setting resistor includes a power conversion module and a power regulating module electrically connected to the power conversion module. The power conversion module is configured to convert an AC electric power into a DC electric power. The power regulating module includes a microprocessor, a voltage-dividing resistor, a constant-voltage regulator, and a constant-current regulator. The voltage-dividing resistor is electrically connected to the setting resistor in series and the microprocessor for providing a first adjustment signal; The constant-voltage regulator is electrically connected to the power conversion module and the node between the dividing resistor and the setting resistor for receiving the first adjustment signal; The constant-current regulator is electrically connected to the power conversion module and the microprocessor for receiving a second adjustment signal in accordance with the setting resistor generated by the microprocessor. A driving signal generated by the constant-voltage regulator and the constant-current regulator is transmitted to the power conversion module for making the power conversion module yield the DC electric power with a desired voltage and a desire current.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
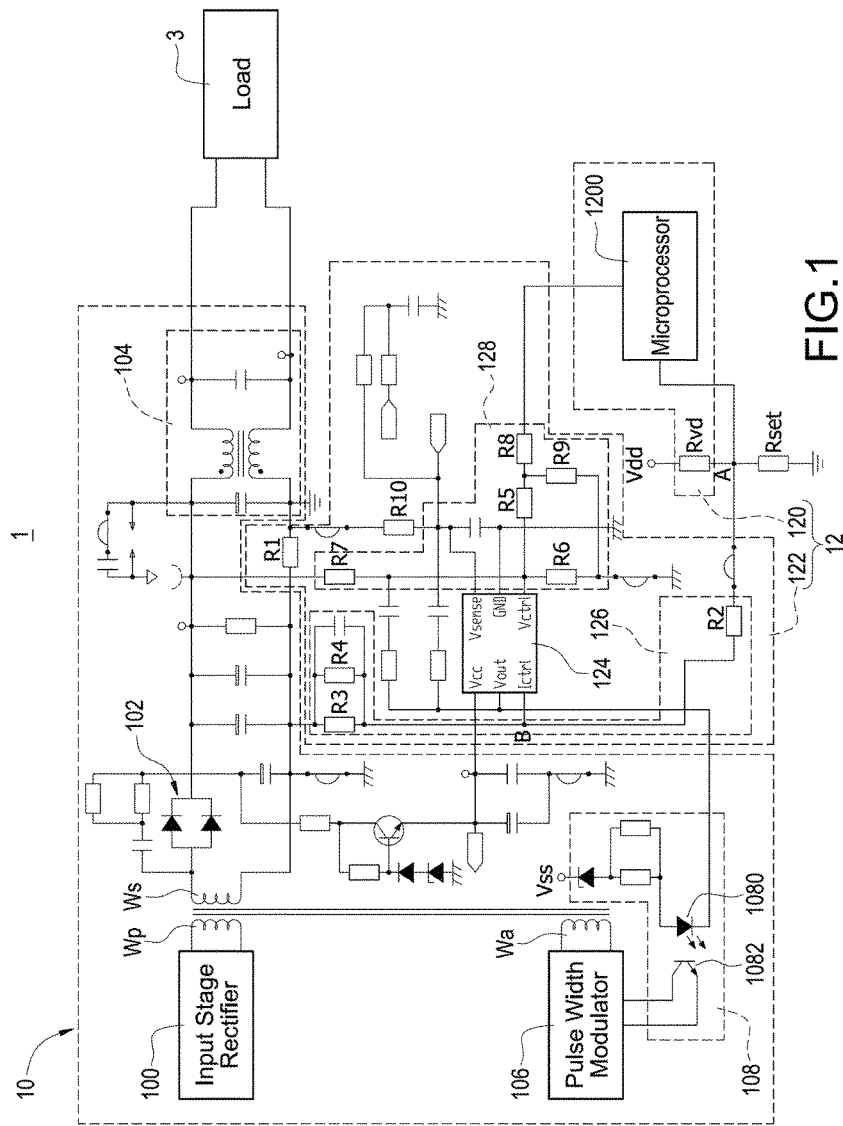
FIG. 1 is a circuit diagram of a power supply device with control based on setting resistor according to a 1st embodiment of the present disclosure.

Reference is made to FIG. 1, which is a circuit diagram of a power supply device with control based on setting resistor according to a 1st embodiment of the present invention. The power supply device with control based on setting resistor (hereafter "power supply device") 1 may be applied to a load 3 with a maximum output power of 60 watts. In particular, the power supply device 1 may be applied to the LED lighting fixture 3 with the maximum output power of 50 watts. The load may be a light emitting diode (LED) light fixture, such as light tube, road lamp, light bulb or other lighting apparatus having LED.

In FIG. 1, the power supply device 1 includes a power conversion module 10 and a power regulating module 12, the power regulating module 12 is electrically connected to the power conversion module 10 and configured to regulate an electric power provided by the power conversion module 10 in accordance with a setting resistor Rset. The load 3 is electrically connected to the power supply device 1 and receiving a regulated electric power. In detail, the setting resistor Rset is a resistor which is configured to ensure that the load 3 is well driven (i.e., prevent the load 3 from damaging or breaking out). The setting resistor Rset may be located in the load 3 or arranged on a circuit board (not shown) where the power supply device 1 is arranged thereon.

The power conversion module 10 a primary winding Wp, a secondary winding Ws magnetically coupled with the primary winding Wp, and an auxiliary winding Wa magnetically coupled with the primary winding Wp. The primary winding Wp and the auxiliary winding Wa are arranged at an input stage, and the secondary winding Ws is arranged at an output stage. The turn ratio of the primary winding Wp and the secondary winding Ws is designated for determining how much electric power (such as voltage and current) can be produced at the output stage. The primary winding Wp, the secondary winding Ws, and the auxiliary winding Wa constitute a transformer 101.

The power conversion module 10 further includes an input stage rectifier 100, an output stage rectifier 102, and an output stage filter 104. The input stage rectifier 100 is electrically connected to the primary winding Wp. The input stage rectifier 100 receives an alternative current (AC) electric power provided by a power source (not shown) and configured to convert the AC electric power into a direct current (DC) electric power. The input stage rectifier 100 is, for example, a bridge rectifier, and the DC electric power may be a full-wave rectified power.

The output stage rectifier 102 is electrically connected to the secondary winding Ws. The output stage filter 104 is arranged between the output stage rectifier 102 and the load 3 and electrically connected thereto. The output stage rectifier 102 rectifies the electric power provided by the secondary winding Ws into a pulsating DC power, and the output stage filter 104 filters the ripple of the pulsating DC electric power and then generates a stable DC electric power. The stable DC electric power is fed to the load 3.

The power conversion module 10 still further includes a feedback unit 108 electrically connected to the pulse width modulator 106 and the power regulating module 12; the pulse width modulator 106 is electrically connected to the auxiliary winding Wa. The feedback unit 108 includes a light emitter 1080 and a light receiver 1082 optically coupled to the light emitter 1080. The light emitter 1080 is, for example, a light emitting diode (LED); the anode of the light emitter 1080 is electrically connected to a DC power VSS, and the cathode thereof is electrically connected to the power regulating module 12. The light receiver 1082 is electrically connected to the pulse width modulator 106.

The power regulating module 12 electrically connected to the power conversion module 10 is configured to make the power conversion module 10 to yield the stable DC electric power with a desired voltage and a desire current in accordance with the setting resistor Rset.

The power regulating module 12 includes a controlling unit 120 and a driving unit 122 electrically connected to the controlling unit 120 and the power conversion module 10. The controlling unit 120 includes a microprocessor 1200 and a voltage-dividing resistor Rvd, the voltage-dividing resistor Rvd is electrically connected to the setting resistor Rset in series, and the microprocessor 1200 is connected to a node A between the voltage-dividing resistor Rvd and the setting resistor Rset for receiving a signal on the node A.

Figure 2:
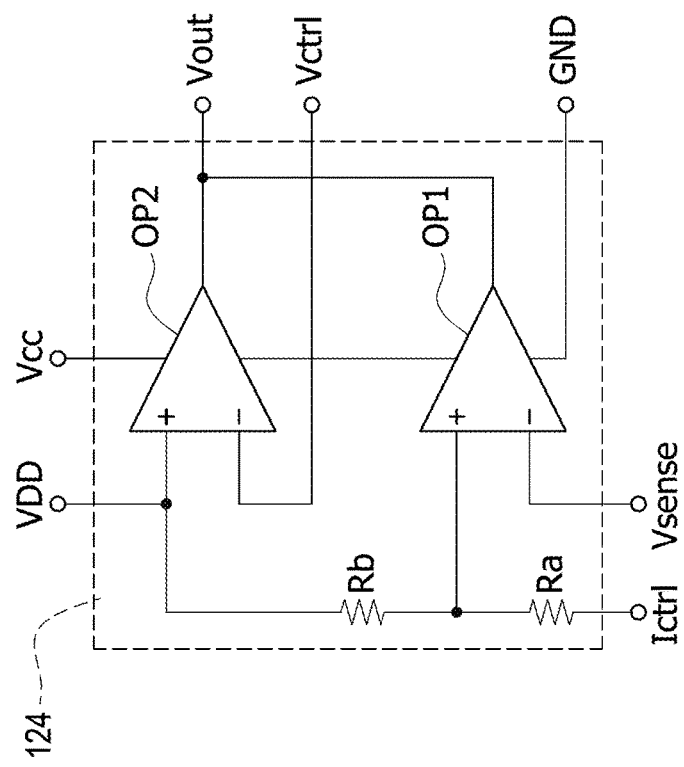
FIG. 2 is a circuit diagram of a driving component according to the 1st embodiment of the present disclosure.

Reference is made to FIG. 1 and FIG. 2, the driving unit 122 includes a first operational amplifier OP1, a second operational amplifier OP2, a first resistor R1, a second resistor R2, a third resistor R3, a fourth resistor R4, a fifth resistor R5, a sixth resistor R6, a seventh resistor R7, an eighth resistor R8, a ninth resistor R9, and a tenth resistor R10. The first operational amplifier OP1 and the second operational amplifier OP2 are located in an integrated circuit (IC) 124 as shown in FIG. 2; not only the first operational amplifier OP1 but also the second operational amplifier OP2 includes an inverting input end, a non-inverting input end, and an output end.

The inverting input end of the first operational amplifier OP1 is electrically connected to the first resistor R1 through tenth resistor R10; the first resistor R1 is arranged between the output stage rectifier 102 and the output stage filter 104 and electrically connected thereto. The non-inverting input end of the first operational amplifier OP1 is electrically connected to a first resistor network 126 via a first internal resistor Ra, wherein the first resistor network 126 is constituted by the second resistor R2, the third resistor R3, and the fourth resistor R4; the first internal resistor Ra may be located in the IC 124.

Specifically, one end of the second resistor R2 is connected to the node A (between the dividing resistor Rvd and the setting resistor Rset), and the other end thereof is connected to the third resistor R3; the other end of the third resistor R3 is connected to the output stage rectifier 102 and the first resistor R1. The fourth resistor R4 is electrically connected to the third resistor R3 in parallel. One end of the first internal resistor Ra is connected to the non-inverting input terminal of the first operational amplifier OP1, and the other end thereof is connected to a node B between the second resistor R2 and the third resistor R3/the fourth resistor R4.

The output end of the first operational amplifier OP1 is electrically connected to the cathode of the light emitter 1080. The first operational amplifier OP1, the first resistor R1, the second resistor R2, the third resistor R3, and the fourth resistor R4 constitute a constant-current (CC) regulator.

The inverting input end of the second operational amplifier OP2 is electrically connected to a second resistor network 128 constituted by the fifth resistor R5, the sixth resistor R6, the seventh resistor R7, the eighth resistor R8, and the ninth resistor R9. In detail, one end of the sixth resistor R6 is connected to the inverting input end of the second operational amplifier OP2, and the other end thereof is electrically connected to ground; one end of the seventh resistor R7 is connected to the inverting input end of the second operational amplifier OP2, and the other end thereof is connected to the output stage rectifier 102; one end of the fifth resistor R5 is connected to the inverting input end of the second operational amplifier OP2, and the other end thereof is connected to one end of the eighth resistor R8 and one end of the ninth resistor R9, the other end of the eighth resistor R8 is directly connected to the microprocessor 1200, and the other end of the ninth resistor R9 is electrically connected to ground.

The non-inverting input end of the second operational amplifier OP2 is electrically connected to the non-inverting input end of the first operational amplifier OP1 via the second internal resistor Rb; the second internal resistor Rb may be located in the IC 124. The non-inverting input end of the second operational amplifier OP2 is further electrically connected to a constant-voltage source VDD, such as a DC power source which can provide an electric power with 2.5 volts. The output end of the second operational amplifier OP2 is electrically connected to the output end of the first operational amplifier OP1. The second operational amplifier OP2, the fifth resistor R5, the sixth resistor R6, the seventh resistor R7, the eighth resistor R8, and the ninth resistor R9 constitute a constant-voltage (CV) regulator.

In operation, a constant voltage Vdd is coupled to the dividing resistor Rvd and the setting resistor Rset to impress a first adjustment signal of the non-inverting input end of the first operational amplifier OP1 and a second adjustment signal of the inverting input end of the second operational amplifier OP2 based on the setting resistor Rset such that the current flow through the light emitter 1080 is adjusted to yield the desired voltage across the load 3 and the desired current flow through the load 3.

To be more specific, the constant voltage Vdd is divided by the voltage-dividing resistor Rvd and the setting resistor Rset electrically connected in series. A divided voltage drop across the setting resistor Rset is adjusted based on the resistance of the setting resistor Rset, which results the first adjustment signal represented by the divided voltage drop across the setting resistor Rset for entering the non-inverting input end of the first operational amplifier OP1 to be adjusted. In addition, the divided voltage drop adjusted based on the resistance of the setting resistor Rset further enters the microprocessor 1200, therefore the second adjustment signal represented by the divided voltage drop across the setting resistor Rset for entering the inverting input end of the second operational amplifier OP2 is adjusted by the microprocessor 1200. The first operational amplifier OP1 and the second operational amplifier OP2 are then output signal in accordance with the comparative result for driving the light emitter 1080 to light with specific intensity.

As the result, the light receiver 1082 sends a signal in accordance with the specific intensity to the pulse width modulator 106, such that the duty cycle of the pulse width modulation signal is modulated to yield the desired voltage and the desired current.

Figure 3:
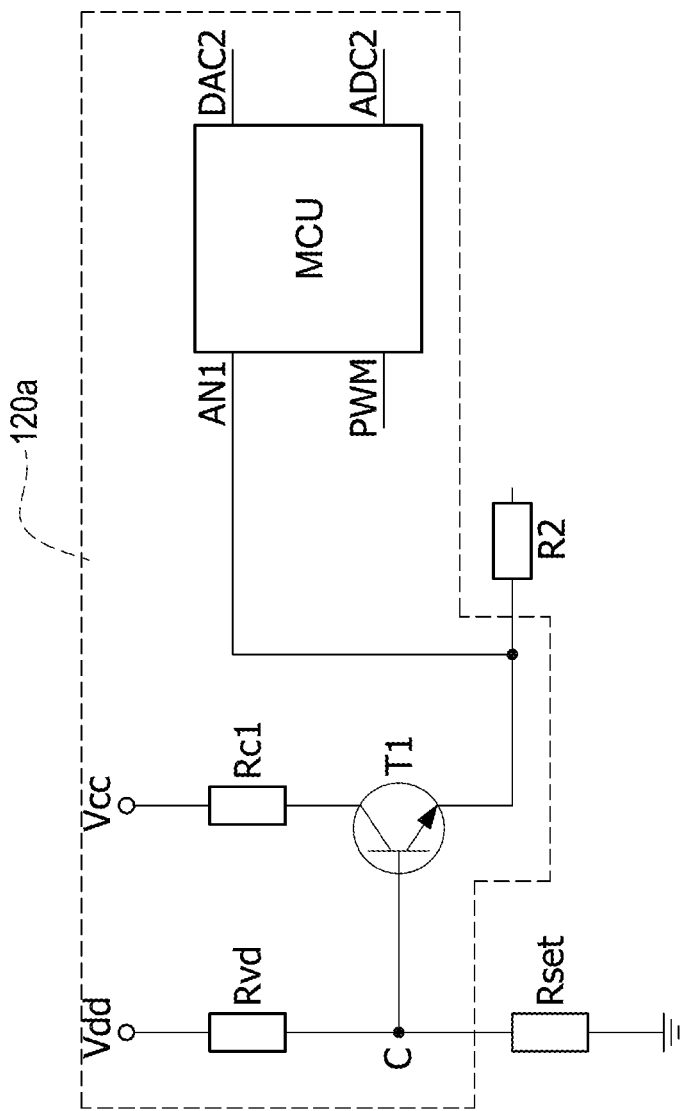
FIG. 3 is a circuit diagram of a controlling unit according to a 2nd embodiment of the present disclosure.

Reference is made to FIG. 3, which is a circuit diagram of a controlling unit according to a 2nd embodiment of the present disclosure. In FIG. 3, the controlling unit 120a includes a voltage-dividing resistor Rvd, a current-limiting resistor Rcl, and a transistor T1. The transistor T1 is an n-type bipolar transistor (BJT). The voltage-dividing resistor Rvd is electrically connected to the setting resistor Rset in series, and a node C between the voltage-dividing resistor Rd and the setting resistor Rset is electrically connected to the base of the transistor T1; the collector of the transistor T1 is electrically connected to the current-limiting Rcl, and the emitter of the transistor T1 is electrically connected to the second resistor R2 and the microprocessor 120.

A constant voltage Vdd is coupled to the dividing resistor Rvd and the setting resistor Rset and another constant voltage Vcc is coupled to the current-limiting resistor Rd to impress a first adjustment signal of the non-inverting input end of the first operational amplifier OP1 and a second adjustment signal of the inverting input end of the second operational amplifier OP2 based on the setting resistor Rset such that the current flow through the light emitter 1080 is adjusted to yield the desired voltage and the desired current.

Figure 4:
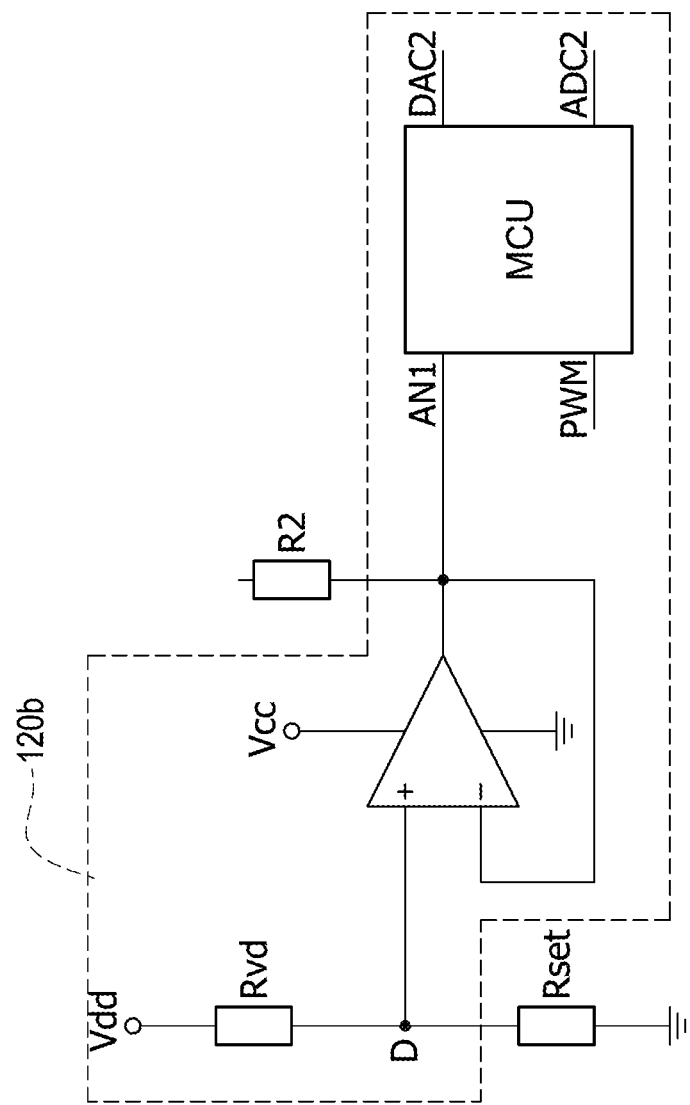
FIG. 4 is a circuit diagram of a controlling unit according to a 3rd embodiment of the present disclosure.

Reference is made to FIG. 4, which is a circuit diagram of a controlling unit according to a 3rd embodiment of the present disclosure. In FIG. 4, the controlling unit 120b includes a microprocessor 1200, a voltage-dividing resistor Rvd, and a comparator Com. The voltage-dividing resistor Rvd is electrically connected to the setting resistor Rset in series. The comparator Com includes two input ends and an output end; one input end of the comparator Com is electrically connected a node D between the voltage-dividing resistor Rvd and the setting resistor Rset, the other input end is electrically connected to the output end, the second resistor R2, and the microprocessor 1200. A constant voltage Vdd is coupled to the dividing resistor Rvd, the setting resistor Rset, and the comparator Com to impress a first adjustment signal of the non-inverting input end of the first operational amplifier OP1 and a second adjustment signal of the inverting input end of the second operational amplifier OP2 based on the setting resistor Rset such that the current flow through the light emitter 1080 is adjusted to yield the desired voltage and the desired current.

Figure 5:
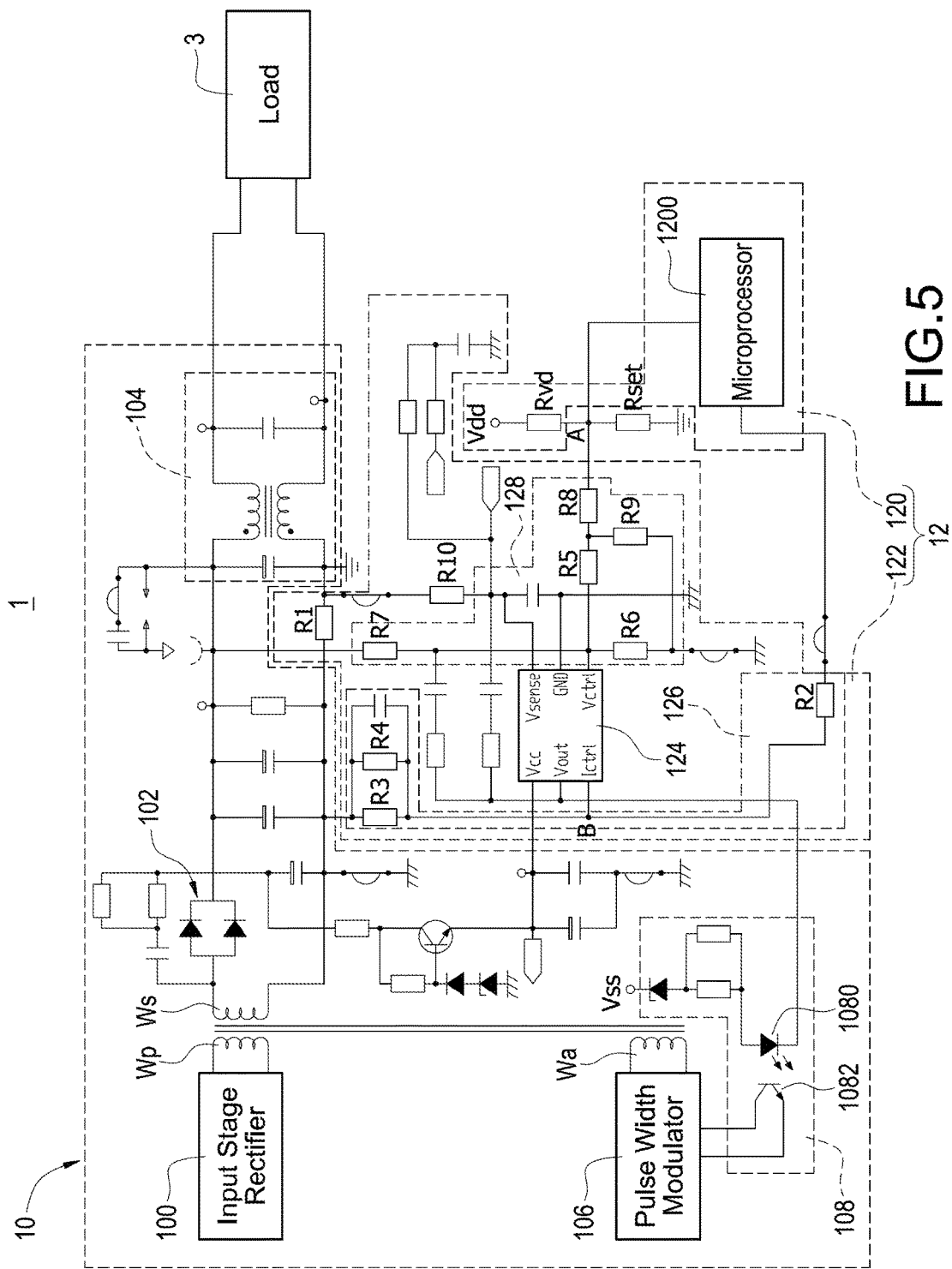
FIG. 5 is a circuit diagram of a power supply device with control based on setting resistor according to a 4th embodiment of the present disclosure

Reference is made to FIG. 5, which is a circuit diagram of a power supply device with control based on setting resistor according to a 4th embodiment of the present disclosure. The power supply device with control based on setting resistor (hereafter "power supply device") includes a power conversion module 10 and a power regulating module 12, and the power regulating module 12 is electrically connected to the power conversion module 10. The load 3 is electrically connected to the power supply device 1 and receiving an electric power provided thereby. In FIG. 5, the scheme of the power conversion module 10 are the same as the power conversion module shown in FIG. 1 mentioned above and is not repeated here for brevity.

The power regulating module 12 electrically connected to the power conversion module 10 is configured to regulate a stable DC electric power sent to the load 3 in accordance with a setting resistor Rset. The power regulating module 12 includes a controlling unit 120 and a driving unit 122 electrically connected to the controlling unit 120 and the power conversion module 10. The controlling unit 120 includes a microprocessor 1200 and a voltage-dividing resistor Rvd, the voltage-dividing resistor Rvd is electrically connected to the setting resistor Rset in series, and the microprocessor 1200 is connected to a node A between the voltage-dividing resistor Rvd and the setting resistor Rset.

Reference is made to FIG. 2 and FIG. 5, the driving unit 122 includes a first operational amplifier OP1, a second operational amplifier OP2, and first to tenth resistors R1~R10; the first operational amplifier OP1 and the second operational amplifier OP2 may be located in an integrated circuit 124 as shown in FIG. 2.

An inverting input end of the first operational amplifier OP1 is electrically connected to the first resistor R1 via the tenth resistor R10, and a non-inverting input end thereof is electrically connected to a first resistor network 126 constitutes by the second resistor R2, the third resistor R3, and the fourth resistor R4 via a first internal resistor Ra; the first internal resistor R1 may be located in the IC 124. Specifically, one end of the second resistor R2 is directly connected to microprocessor 1200, and the other end thereof is connected to the third resistor R3; the other end of the third resistor R3 is connected to the output stage rectifier 102 and the first resistor R1. The fourth resistor R4 is electrically connected to the third resistor R3 in parallel. One end of the first internal resistor Ra is connected to the non-inverting input terminal of the first operational amplifier OP1, and the other end thereof is connected to a node B between the second resistor R2 and the third resistor R3/the fourth resistor R4. An output end of the first operational amplifier OP1 is electrically connected to the light emitter 1080. The first operational amplifier OP1, the first resistor R1, the second resistor R2, the third resistor R3, and the fourth resistor R4 constitute a constant-current regulator.

An inverting input end of the second operational amplifier OP2 is electrically connected to a second resistor network constituted by the fifth resistor R5, the sixth resistor R6, the seventh resistor R7, the eighth resistor R8, and ninth resistor R9. In detail, one end of the sixth resistor R6 is connected to the inverting input end of the second operational amplifier OP2, and the other end thereof is electrically connected to ground; one end of the seventh resistor R7 is connected to the inverting input end of the second operational amplifier OP2, and the other end thereof is connected to the output stage rectifier 102; one end of the fifth resistor R5 is connected to the inverting input end of the second operational amplifier OP2, and the other end thereof is connected to one end of the eighth resistor R8 and one end of the ninth resistor R9, the other end of the eighth resistor R8 is connected to the node A between the voltage-dividing resistor Rvd and the setting resistor Rset, and the other end of the ninth resistor R9 is electrically connected to ground.

A non-inverting input end of the second operational amplifier OP2 is electrically connected to the non-inverting input end of the first operational amplifier OP1 via the second internal resistor Rb; the second internal resistor Rb may be located in the IC 124. The non-inverting input end of the second operational amplifier OP2 is further electrically connected to a constant-voltage source VDD. An output end of the second operational amplifier OP2 is electrically connected to the output end of the first operational amplifier OP1. The second operational amplifier OP2, the fifth resistor R5, the sixth resistor R6, the seventh resistor R7, the eighth resistor R8, and the ninth resistor R9 constitute a constant-voltage regulator.

In operation, a constant voltage Vdd is coupled to the dividing resistor Rvd and the setting resistor Rset to impress a first adjustment signal of the inverting input end of the second operational amplifier OP2 and a second adjustment signal of the non-inverting input end of the first operational amplifier OP1 based on the setting resistor Rset such that the current flow through the light emitter 1080 is adjusted to yield a desired voltage and a desired current.

To be more specific, the constant voltage Vdd is divided by the voltage-dividing resistor Rvd and the setting resistor Rset electrically connected in series. A divided voltage drop across the setting resistor Rset is adjusted based on the resistance of the setting resistor Rset, which results the first adjustment signal represented by the divided voltage drop across the setting resistor Rset for entering the inverting input end of the second operational amplifier OP2 to be adjusted. In addition, the divided voltage drop adjusted based on the resistance of the setting resistor Rset further enters the microprocessor 1200, therefore the second adjustment signal represented by the divided voltage drop across the setting resistor Rset for entering the non-inverting input end of the first operational amplifier OP1 is adjusted by the microprocessor 1200. The first operational amplifier OP1 and the second operational amplifier OP2 are then output signal in accordance with the comparative result for driving the light emitter 1080 to light with specific intensity.

As the result, the light receiver 1082 sends a signal in accordance with the specific intensity to the pulse width modulator 106, such that the duty cycle of the pulse width modulation signal is modulated to yield the desired voltage and the desired current.

It should be noted that the controlling unit shown in FIG. 5 may be replaced by the controlling unit 120a shown in FIG. 3 or the controlling unit 120b shown in FIG. 4, and the function and relative description of the power supply device with the controlling unit 120a or the controlling unit 120b can achieve the functions as the power supply device 1 shown in FIG. 5 does.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply device with control based on a setting resistor comprising:
   a power conversion module configured to convert an alternating current (AC) electric power into a direct current (DC) electric power; and
   a power regulating module electrically connected to the power conversion module, the power regulating module comprising:
      a voltage-dividing resistor electrically connected to the setting resistor in series for providing a first adjustment signal in accordance with the setting resistor;
      a microprocessor electrically connected to the setting resistor for generating a second adjustment signal in accordance with the setting resistor;
      a constant-current regulator electrically connected to the power conversion module, the voltage-dividing resistor, and the setting resistor, and receiving the first adjustment signal; and
      a constant-voltage regulator electrically connected to the power conversion module and the microprocessor for receiving the second adjustment signal;
      wherein driving signals generated by the constant-current regulator and the constant-voltage regulator are transmitted to the power conversion module for making the power conversion module yield the DC electric power with a desired voltage and a desire current.

2. The power supply device with control based on a setting resistor of claim 1, wherein the constant-current regulator comprising:
   a first operational amplifier;
   a first resistor electrically connected to the power conversion module and an inverting input end of the first operational amplifier; and
   a first resistor network electrically connected to the power conversion module and a non-inverting input end of the first operational amplifier;
   wherein the constant-current regulator comprising:
   a second operational amplifier, wherein a non-inverting input end of the second operational amplifier is electrically connected to the non-inverting input end of the first operational amplifier, and an output end of the second operational amplifier is electrically connected to an output end of the first operational amplifier; and
   a second resistor network electrically connected to an inverting input end of the second operational amplifier.

3. The power supply device with control based on a setting resistor of claim 2, wherein a node between the dividing resistor and the setting resistor is connected to the first resistor network and the microprocessor for providing the first adjustment signal to the non-inverting input ends of the first operational amplifier and the second operational amplifier, and the microprocessor is electrically connected to the second resistor network for providing the second adjustment signal to the inverting input end of the second operational amplifier.

4. The power supply device with control based on a setting resistor of claim 3, wherein the power regulating module further comprising:
   a current limitation resistor;

a transistor, wherein the base of the transistor is connected to the node between the dividing resistor and the setting resistor, the collector of the transistor is connected to the current limitation resistor, and the emitter of the transistor is connected to the first resistor network and the microprocessor.

5. The power supply device with control based on a setting resistor of claim 3, wherein the power regulating module further comprising a comparator, a non-inverting input end of the controlling unit electrically connected to a node between the voltage-divided resistor, and an inverting input end of the controlling unit electrically connected to an output end and thereof, the first resistor network, and the microprocessor.

6. The power supply device with control based on a setting resistor of claim 2, wherein the first operational amplifier and the second operational amplifier are located in an integrated circuit.

7. The power supply device with control based on a setting resistor of claim 6, wherein the power regulating module further comprises a first internal resistor and a second internal resistor, the first internal resistor is connected to the non-inverting input end of the second operational amplifier, and the second internal resistor is connected to the non-inverting input end of the first operational amplifier and the non-inverting input end of the second operational amplifier.

8. The power supply device with control based on a setting resistor of claim 7, wherein the first internal resistor and the second internal resistor are located in the integrated circuit.

9. The power supply device with control based on a setting resistor of claim 2, wherein the power conversion module further comprises a feedback unit, the feedback unit comprises:
   a light emitter electrically connected to the output ends of the first operational amplifier and the second operational amplifier; and
   a light receiver optically coupled with the light emitter and electrically connected to the power conversion module.

10. The LED driving device of claim 9, wherein the power conversion module comprises:
   a transformer comprising a primary winding, a second winding magnetically coupled with the primary winding, and an auxiliary winding magnetically coupled with the primary winding;
   an input stage rectifying unit electrically connected to the primary winding;
   an output stage rectifying unit electrically connected to the secondary winding;
   an output stage filter electrically connected to the rectifying unit; and
   a pulse width modulator electrically connected to the auxiliary winding and the light receiver.

11. A power supply device with control based on a setting resistor comprising:
   a power conversion module configured to convert an alternating current (AC) electric power into a direct current (DC) electric power; and
   a power regulating module electrically connected to the power conversion module, the power regulating module comprising:
      a voltage-dividing resistor electrically connected to the setting resistor in series for providing a first adjustment signal in accordance with the setting resistor;
      a microprocessor electrically connected to the setting resistor for generating a second adjusting signal in accordance with the setting resistor;
      a constant-voltage regulator electrically connected to the power conversion module, the voltage-dividing resistor, and the setting resistor, and receiving the first adjustment signal; and
      a constant-current regulator electrically connected to the power conversion module and the microprocessor for receiving the second adjustment signal;
      wherein a driving signal generated by the constant-voltage regulator and the constant-current regulator is transmitted to the power conversion module for making the power conversion module yield the DC electric power with a desired voltage and a desire current.

12. The power supply device with control based on a setting resistor of claim 11, wherein the constant-current regulator comprising:
   a first operational amplifier;
   a first resistor electrically connected to the power conversion module and an inverting input end of the first operational amplifier; and
   a first resistor network electrically connected to the power conversion module and a non-inverting input end of the first operational amplifier;
   wherein the constant-current regulator comprising:
   a second operational amplifier, wherein a non-inverting input end of the second operational amplifier is electrically connected to the non-inverting input end of the first operational amplifier, and an output end of the second operational amplifier is electrically connected to an output end of the first operational amplifier; and
   a second resistor network electrically connected to an inverting input end of the second operational amplifier.

13. The power supply device with control based on a setting resistor claim 12, wherein a node between the dividing resistor and the setting resistor is connected to the second resistor network and the microprocessor for providing the first adjustment signal to the inverting input end of the second operational amplifier, and the microprocessor is electrically connected to the first resistor network for providing the second adjustment signal to the non-inverting input ends of the first operational amplifier and the second operational amplifier.

14. The power supply device with control based on a setting resistor of claim 12, wherein the power regulating module further comprising:
   a current limitation resistor;
   a transistor, wherein the base of the transistor is connected to the node between the dividing resistor and the setting resistor, the collector of the transistor is connected to the current limitation resistor, and the emitter of the transistor is connected to the second resistor network and the microprocessor.

15. The power supply device with control based on a setting resistor of claim 12, wherein the power regulating module further comprising a comparator, a non-inverting input end of the controlling unit electrically connected to a node between the voltage-divided resistor, and an inverting input end of the controlling unit electrically connected to an output end and thereof, the second resistor network, and the microprocessor.

16. The power supply device with control based on a setting resistor of claim 12, wherein the first operational amplifier and the second operational amplifier are located in an integrated circuit.

17. The power supply device with control based on a setting resistor of claim 16, wherein the power regulating module further comprises a first internal resistor and a second internal resistor, the first internal resistor is connected to the non-inverting input end of the second operational amplifier, and the second internal resistor is connected to the non-inverting input end of the first operational amplifier and the non-inverting input end of the second operational amplifier.

18. The power supply device with control based on a setting resistor of claim 17, wherein the first internal resistor and the second internal resistor are located in the integrated circuit.

19. The power supply device with control based on a setting resistor of claim 12, wherein the feedback unit comprising:
   a light emitter electrically connected to the output ends of the first operational amplifier and the second operational amplifier; and
   a light receiver optically coupled with the light emitter and electrically connected to the power conversion module.

20. The power supply device with control based on a setting resistor of claim 12, wherein the power conversion module comprising:
   a transformer comprising a primary winding, a second winding magnetically coupled with the primary winding, and an auxiliary winding magnetically coupled with the primary winding;
   an input stage rectifying unit electrically connected to the primary winding;
   an output stage rectifying unit electrically connected to the secondary winding;
   an output stage filter electrically connected to the rectifying unit; and
   a pulse width modulator electrically connected to the auxiliary winding and the light receiver.

* * * * *